United States Patent
Hirdina

(10) Patent No.: US 9,896,318 B2
(45) Date of Patent: Feb. 20, 2018

(54) METHOD AND DEVICE FOR MANUFACTURING AND FILLING THIN-WALLED BEVERAGE CONTAINERS

(71) Applicant: KRONES Aktiengesellschaft, Neutraubling (DE)

(72) Inventor: Jochen Hirdina, Regensburg (DE)

(73) Assignee: KRONES Aktiengesellschaft, Neutraubling (DE)

( * ) Notice: Subject to any disclaimer, the term of this patent is extended or adjusted under 35 U.S.C. 154(b) by 0 days.

(21) Appl. No.: 15/149,617

(22) Filed: May 9, 2016

(65) Prior Publication Data

US 2016/0251207 A1 Sep. 1, 2016

Related U.S. Application Data

(63) Continuation of application No. 12/660,767, filed on Mar. 4, 2010, now abandoned.

(30) Foreign Application Priority Data

Mar. 6, 2009 (DE) .................. 10 2009 011 583

(51) Int. Cl.
*B29C 49/42* (2006.01)
*B67C 3/14* (2006.01)
(Continued)

(52) U.S. Cl.
CPC ............ *B67C 3/14* (2013.01); *B29C 49/12* (2013.01); *B29C 49/4273* (2013.01);
(Continued)

(58) Field of Classification Search
None
See application file for complete search history.

(56) References Cited

U.S. PATENT DOCUMENTS 4,206,171 A   6/1980 Uhlig
4,318,882 A * 3/1982 Agrawal ............ B29C 49/6481
                                                                   264/520
(Continued)

FOREIGN PATENT DOCUMENTS

CN       1201547       12/1998
CN     101195271        6/2008
(Continued)

OTHER PUBLICATIONS

Crystallization Behavior of PET Materials, by Bilal Demirel, Ali Yaras, Huseyin Elcicek; Dergisi Cilt, Jan. 1, 2011, pp. 26-35, XP055362074, Found in the internet: URL: http://fbe.balikesir.edu.tr/dergi/20111/BAUFBE2011-1-3.pdf.
(Continued)

*Primary Examiner* — Monica Huson
(74) *Attorney, Agent, or Firm* — Simmons Perrine Moyer Bergman PLC

(57) ABSTRACT

A device for manufacturing and filling beverage containers (12) having thin walls and/or at least partially unstable shapes under the influence of heat is described, in which the containers (12) are manufactured by blow molding of preforms (10), then filled with a hot liquid filling product (16), next pressurized by a compressed gas (18), and then sealed. The preforms (10) and the containers (12) molded therefrom are pressurized during blow molding at a blow molding temperature, which is essentially below 110° C.

16 Claims, 2 Drawing Sheets

(51) Int. Cl.
  *B29C 49/12* (2006.01)
  *B29C 49/48* (2006.01)
  *B67C 3/04* (2006.01)
  *B29C 49/46* (2006.01)
  *B67C 3/22* (2006.01)
  *B29K 667/00* (2006.01)
  *B29L 31/00* (2006.01)

(52) U.S. Cl.
  CPC .......... *B29C 49/4823* (2013.01); *B67C 3/045* (2013.01); *B67C 3/225* (2013.01); *B29C 49/46* (2013.01); *B29C 2049/4608* (2013.01); *B29K 2667/003* (2013.01); *B29L 2031/7158* (2013.01); *B67C 2003/227* (2013.01)

(56) References Cited

U.S. PATENT DOCUMENTS

| | | | |
|---|---|---|---|
| 4,439,394 A | 3/1984 | Appleyard | |
| 4,524,045 A | 6/1985 | Hayashi et al. | |
| 4,755,404 A | 7/1988 | Collette | |
| 4,883,631 A * | 11/1989 | Ajmera | B29C 49/6472 264/237 |
| 5,133,468 A | 7/1992 | Brunson et al. | |
| 5,203,140 A | 4/1993 | Jamieson | |
| 5,251,424 A | 10/1993 | Zenger et al. | |
| 5,501,590 A | 3/1996 | Orimoto et al. | |
| 5,547,631 A | 8/1996 | Mero et al. | |
| 5,753,175 A | 5/1998 | Sato et al. | |
| 5,941,054 A | 8/1999 | Valyi | |
| 5,975,880 A | 11/1999 | Takada et al. | |
| 6,063,465 A | 5/2000 | Charbonneau et al. | |
| 6,119,433 A | 9/2000 | Kitahora et al. | |
| 6,418,731 B1 | 7/2002 | Anthony | |
| 6,458,314 B1 | 10/2002 | Ghatta | |
| 6,502,369 B1 * | 1/2003 | Andison | B65B 3/022 53/275 |
| 7,416,089 B2 | 8/2008 | Kraft et al. | |
| 7,553,441 B2 | 6/2009 | Shi | |
| 8,354,054 B2 | 1/2013 | Haesendockx et al. | |
| 2008/0164642 A1 * | 7/2008 | Hirdina | B29C 49/18 264/528 |
| 2009/0071104 A1 | 3/2009 | Fischer | |

FOREIGN PATENT DOCUMENTS

| | | |
|---|---|---|
| DE | 2807949 | 8/1979 |
| DE | 19520925 | 12/1996 |
| DE | 102005000681 | 7/2006 |
| JP | 56013141 | 2/1981 |
| JP | 06263190 | 9/1994 |
| WO | 20000053396 | 9/2000 |
| WO | 2005044540 | 5/2005 |
| WO | 2007033722 | 3/2007 |

OTHER PUBLICATIONS

Patent Application EP10 153 840.3-1703—Krones—Office Action dated Apr. 12, 2017.

Chinese Patent Application—Chinese Office Action Cited References, dated Jun. 10, 2016.

* cited by examiner

METHOD AND DEVICE FOR MANUFACTURING AND FILLING THIN-WALLED BEVERAGE CONTAINERS

CLAIM OF PRIORITY

This application is a continuation of U.S. patent application Ser. No. 12/660,767, filed on Mar. 4, 2010, which in turn claims the benefit of German Patent Application DE 10 2009 011 583.8, filed on Mar. 6, 2009, all of which are incorporated by reference.

FIELD OF THE INVENTION

The present invention relates to a method and a device for manufacturing and filling beverage containers having thin walls and/or at least partially unstable shapes under the influence of heat.

BACKGROUND OF THE INVENTION

In sterile bottling of beverages, it is known that the air present in the head space of the beverage container may be displaced, e.g., by introducing liquid nitrogen, as is known from EP 0 481 019 B1, for example. Adding liquid nitrogen largely displaces the total atmospheric oxygen present in the container, thereby achieving better shelf life of the beverage.

In hot bottling of beverages in PET containers, the thermal stability of the material and the vacuum stability of the container also constitute a challenge, which is met through various measures. Because of the low glass transition point of approximately 75° C., the thermal stability of PET is not sufficient for filling temperatures of sensitive products, which are usually bottled in temperature ranges between 85° C. and 92° C. Therefore, the material must usually be thermally crystallized in processing in the stretch blow molding machine. This is implemented by a high temperature of the processed preforms (so-called preform temperature) and heated blow molds (120° C. to 160° C.). However, this results in much higher energy consumption because in these methods, additional cooling of the container by compressed air is necessary before unmolding. Another disadvantage is the limited output performance due to the required crystallization time in the mold.

Compensation for the volume shrinkage of the filling product due to cooling may be implemented by a relatively complex bottle design, such as that known from WO 2006/062829 A2, for example. These bottles, which are suitable for hot bottling containers, are much heavier in comparison with conventional designs for cold bottling containers, are more complex to manufacture, and thus are also much more expensive. However, in view of the high cost of raw materials, which will continue to rise in the future, it is becoming increasingly less economical to achieve the advantages of hot bottling by way of a higher bottle weight. Furthermore, bottles having vacuum equalizing surfaces are more difficult to label and in some cases have a definitely reduced stackability.

For this reason, JP 06 263 190 A describes a method for hot filling of thin-walled containers, in which the container stability after the cooling phase is to be ensured by introducing liquid nitrogen, because its expansion counteracts the shrinkage process due to the cooling of the container contents.

SUMMARY OF THE INVENTION

An object of the present invention is to provide a process sequence for container manufacturing and filling, which will ensure an improved energy-efficient method of providing filled beverage containers in the most reliable possible manner starting from a preform, to its blow molding to form a beverage container and then to hot filling. One primary focus of attention is to ensure the least possible deviation in shape from the blow-molded container contour as a result of the subsequent filling and cooling of the container and of the filling product in the container.

The present invention provides a method for manufacturing and filling beverage containers having thin walls and/or at least partially unstable shapes under the influence of heat, in particular PET bottles or similar containers having a low thermal stability, the containers being manufactured by blow molding of preforms, then filled with a hot liquid filling product (16), next pressurized by a compressed gas (18) and then sealed, by exposing the preforms and the containers molded therefrom to a blow molding temperature essentially below 110° C. during blow molding. It is advantageous in particular when the blow molding temperature is essentially below 100° C. In numerous experiments, temperatures in a range of 80° C. to 90° C. in blow molding have proven to be practical in particular. After blow molding, the containers and in particular the container bottoms are cooled before transporting the containers to the filling machine. The containers are cooled to approximately a typical ambient temperature (approximately room temperature or below). In order for the bottles not to shrink excessively after cooling of the hot-filled liquid filling product, the containers are exposed to nitrogen after filling. Furthermore, care is taken to ensure that the blow molding temperature is below 110° C., preferably between 60° C. and 95° C. and most preferably between 80° C. and 90° C.

In a preferred variant of the method according to the present invention, liquid temperature-regulating medium flows through the blow mold via a duct system. For this temperature-regulating medium, essentially water may be used if the blow molding temperature is not above 100° C. The blow mold is usually connected by hose lines to a central distributor at the center of the blow molding machine. A network of bores through which the temperature-regulating medium flows passes through the blow mold. Each of the two blow molds (per blow molding station) has two connections for the forward flow and return flow of the medium. According to the present invention, this medium transfers heat to the blow mold in this large-area bore labyrinth in a temperature range below 110° C. The bottom of the blow mold normally has separate connections for a second circuit at a different temperature. The bottom temperature is preferably less than 30° C., preferably less than 10° C., if possible.

A special advantage of the method according to the present invention is that the method may be performed at temperatures below 100° C. using water as the temperature-regulating medium for the blow molding rather than oil at 130° C. to 140° C., as is customary in the known related art. In other words, it is advantageously possible to work with water instead of oil as the temperature-regulating medium.

A traditional so-called hot-fill method works with blow molding temperatures of approximately 130° C. and filling product temperatures of approximately 90° C. The drawn PET is then pressed against the hot mold wall during the blow molding operation to remove stresses from the material, so that after the subsequent contact with the hot filling product at a later time, the PET bottle is unable to shrink back into the undrawn preform. Because of the material structure thereby formed, it is also possible to speak of low-stress PET.

In contrast with these methods known from the related art, the present invention allows only a maximum blow molding temperature of 110° C., preferably of approximately 80° C. to 90° C. (at a filling product temperature of also approximately 90° C.), so that inherent stresses remain in the drawn PET to allow better compensation for the subsequent pressurization with nitrogen.

It may also be advantageous to send the containers to the filling operation immediately after the blow molding operation without an intermediate buffer or interim storage. The purpose of this is primarily to establish largely the same conditions (moisture uptake, cooling) for all bottles and/or containers. In other words, no buffer is used between the blow molding machine and the filling machine, but instead each bottle is transferred to the filling machine in the same time period. The bottles are preferably kept with the same spacing in this temporarily stored conveyance system. The constant conveyance time between the blow molding machine and the filling machine could not be guaranteed when using a buffer.

The method according to the present invention has the particular advantage that the bottle quality is kept at a very constant level because the same extent of shrinkage and thus always constant filling levels are largely ensured. Furthermore, combining the steps of container molding and container filling structurally, in time and in terms of process engineering, as is preferred but is not absolutely necessary, has the advantage that all parameters important for a satisfactory procedure are much more easily kept constant and/or may be influenced more easily in the desired manner than is the case with the traditional method.

The method according to the present invention is used for filling beverage containers having thin walls and/or at least partially unstable shapes under the influence of heat, e.g., of PET bottles or similar containers having a low thermal stability with a hot liquid filling product, which is bottled in the containers, after which these containers are pressurized by a compressed gas and then sealed. According to the present invention, the containers are sent to the filling operation after a blow molding operation, so that the containers, which are still hot after the blow molding operation, may be sent to the filling operation without any major delay, using a conveyance system in which the bottles are cooled, if necessary. The containers are therefore blown, conveyed, and filled with the hot liquid within short distances, in particular through design and/or structural integration of a blow molding station with a downstream filling station.

According to one embodiment variant of the method according to the present invention, the containers are treated and drawn with the aid of a liquid-cooled drawing rod during the blow molding operation. The containers may optionally be treated and drawn with the aid of a drawing rod, which is gas cooled and/or through which gas flows during the blow molding operation. It is preferable here for a liquid or gas outlet to be provided essentially on an end face of the drawing rod facing the bottom of the container to be molded. Essentially the bottom of the container is cooled in this way; the side walls should also be largely cooled but a cold bottom is more important.

The method may provide for gaseous or liquid nitrogen to be used as the compressed gas for acting upon the filled containers. The nitrogen ensures that no partial vacuum exists in the containers after cooling, so the relatively thin-walled and/or bendable containers are not deformed by the vacuum in an undesirable manner.

The filling product is typically filled into the container at a temperature above 60° C., in particular at a temperature above 75° C. The method according to the present invention is suitable in particular for filling temperatures of the liquid filling product between approximately 80° C. and 95° C., in particular between approximately 85° C. and 92° C. The filling pressure of the compressed gas introduced after filling the container with liquid filling product may be approximately 2 bar or more, so that the internal pressure of the cooled containers is still greater than the ambient atmospheric pressure at a filling product temperature of less than 4° C., which corresponds to storage of the bottle in a refrigerator.

Another goal of the present invention is to make available a device for manufacturing and filling containers, which is able to ensure an improved method of providing filled beverage containers in the most energy-efficient and reliable way possible from a preform by blow molding to form a beverage container, which is then hot filled.

The present invention relates to a container processing device for molding and/or manufacturing beverage containers having thin walls and/or at least partially unstable shapes under the influence of heat, e.g., PET bottles or such containers having a low thermal stability and also for sterile filling thereof with a hot liquid filling product. The container processing device includes at least one container molding station for molding preforms to form beverage containers by a blow molding method, a container filling station for filling the containers with hot filling product, a gassing station for pressurizing the filled containers with a compressed gas, and a sealing device for pressure-tight and airtight sealing of the containers. According to the container processing device according to the present invention, the container molding station is formed by a blow molding station for stretch blow molding of the preforms to form plastic containers, the blow molding station including a blow mold having a duct system for a temperature-regulating medium to flow through, the temperature-regulating medium being formed essentially by water. The blow mold may be connected by hose lines, for example, to a central distributor at the center of the blow molding machine. A network of bores, through which the temperature-regulating medium flows, passes through the blow mold. Each of the two blow molds usually present per blow molding station has two connections for forward flow and return flow of the medium. In this large-area bore labyrinth, this medium transfers heat to the blow mold, namely in a temperature range of less than 110° C., preferably less than 100° C. The bottom normally has separate connections for another temperature-regulating medium circuit at another temperature. The bottom temperature may preferably be less than 30° C. when cold, more preferably less than 10° C. A particular advantage of this embodiment is that with the device according to the present invention, it is possible to work with water as the temperature-regulating medium for the blow molds at temperatures below 100° C., whereas in the related art, only oil may be used as the temperature-regulating medium at temperatures of 130° C. to 140° C.

According to one embodiment variant of the device according to the present invention, the container molding station and the container filling station are integrated in design and/or structure. With the device according to the present invention, the container molding station is preferably formed by a blow molding station for stretch blow molding of the preforms to form plastic containers, the container filling station, which is combined with it in space and/or design, being connected thereto.

In another embodiment variant of the container processing device according to the present invention, the blow molding station has a liquid-cooled or gas-cooled and/or gas-purged drawing rod, an opening to the liquid or gas outlet being situated essentially on an end face of the drawing rod facing the bottom of the container to be molded.

The device according to the present invention may be designed in particular as a rotary machine for continuous container molding and container filling in one integrated process.

The present invention provides a method for hot bottling, which has been improved and developed further in essential aspects in comparison with the known methods. Hot bottling still takes place in a typical temperature range, which should usually be between approximately 85° C. and 92° C. To compensate for the volume shrinkage occurring in cooling of the hot-filled liquid, the method operates with pressurization. Pressurization is currently achieved by adding nitrogen because in numerous experiments with PET bottles, such nitrogen pressurization has proven to be particularly advantageous. The improved process technology of hot filling with pressurization makes it possible to revise the process engineering to be employed in hot bottling in some aspects, thereby providing novel variants. The result is a novel method claim for stretch blow molding and filling technology. To compensate for or diminish the reshrinkage effects occurring in the drawn PET at the filling temperature, in the method according to the present invention, the container is stabilized by pressurization, not by thermal crystallization of the bottle. This means that pressurization is also utilized for mechanical stabilization in addition to volume compensation. This has the advantage that thermal crystallization of the material is no longer necessary and it is possible to work with conventional blow molding technology. The present invention relates to the manufacture of containers, e.g., PET bottles, as well as their filling. The PET bottles are hot filled and pressurized, with the blow molding temperature typically to be set between 10° C. and 110° C., preferably 60° C. and 95° C., and most preferably between 80° C. and 90° C. A preferred temperature range is 80° C. to 90° C.

If working with a buffer for the blow-molded containers between the blow molding station and the filling station, it may be advantageous to discharge such containers whose dwell time in the buffer is too long because if the dwell time is too long, too much internal stress in the PET is dissipated, but this is a disadvantage and should be avoided in the present context in the interest of the least possible shrinkage of the filled bottles which are exposed to gas and are cooling.

Finally, it should be pointed out that through the structural integration of the individual container processing stations and through the method steps defined by the present invention, particularly good suitability for sterile bottling of beverages in these containers is achieved.

Additional features, goals and advantages of the present invention are derived from the following detailed description of a preferred specific embodiment of the present invention, which is given as a nonrestrictive example and refers to the accompanying drawings. The same components here have the same reference numerals in principle and will not be described repeatedly in some cases.

DETAILED DESCRIPTION OF THE INVENTION

Figure 1:
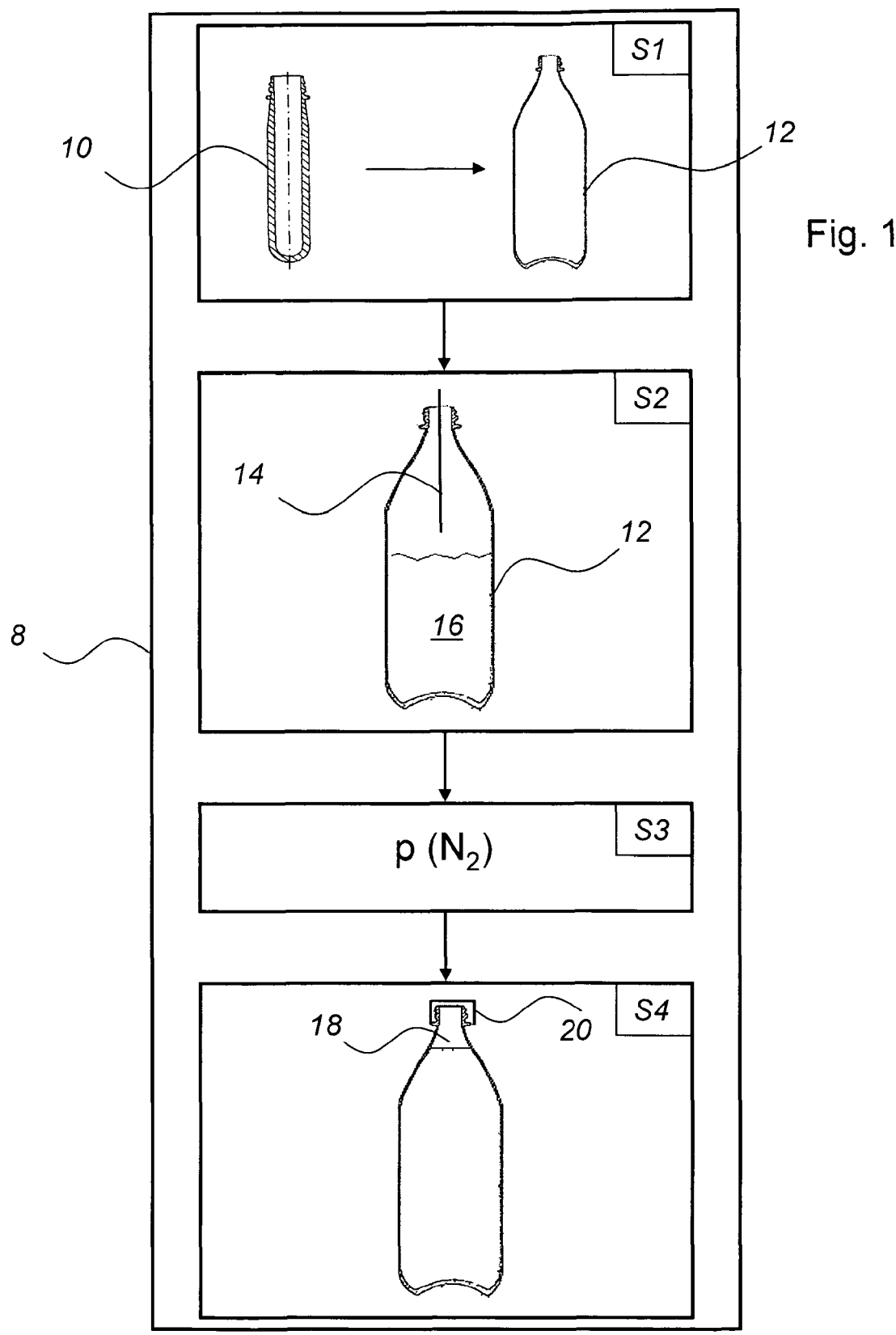
FIG. 1 shows a schematic flow chart to illustrate successive method steps in hot bottling of beverage in containers.

The schematic flow chart in FIG. 1 shows successive method steps in molding preforms to form containers and the subsequent hot bottling of beverages in these containers. The method presented here allows sterile filling of beverage containers and/or PET bottles having thin walls and/or at least partially unstable shapes under the influence of heat. These PET bottles are filled with a hot liquid beverage, after which the bottles are pressurized by nitrogen as a compressed gas and then sealed.

In a first method step 51, preforms 10 are molded by a blow molding operation to form beverage containers 12, which are filled with a hot beverage 16 in a subsequent method step S2 by a suitable filling device 14. Containers 12, which are still hot after the blow molding operation, are cooled in a controlled manner and then sent to filling operation S2. Containers 12 are blown, conveyed, and filled with hot liquid 16 within short distances, in particular through design and/or structural integration of a blow molding station with a downstream filling station. It may be advantageous in this context to be sure that bottles 12 remain at the same spacing, which is advantageous for ensuring constant filling and shrinkage conditions. The design and/or structural integration may also be referred to as "blocking" of the blow molding machine and filling machine.

In a subsequent method step S3, the air in the upper area of container 12 is displaced by filling with liquid or gaseous nitrogen, so that the mechanical stability of container 12 may at the same time be ensured after cooling of liquid 16.

In a subsequent method step S4, container 12, which has been filled with hot liquid 16 and pressurized with liquid or pressurized liquefied compressed gas 18, is sealed with a sealing cover 20. After sealing containers 12, compressed gas 18 evaporates slowly, while the pressure in the bottle increases. Containers 12 filled in this way may be sent to a packaging and/or storage logistics after a cooling phase and interim storage, if necessary.

Gaseous or liquid nitrogen ($N_2$) in particular may be used as compressed gas 18 in method step S3. Nitrogen ensures that there will be no partial vacuum in containers 12 after cooling, so that containers 12, which have relatively thin walls and/or are soft enough to bend, do not deform in an unwanted manner due to partial vacuum. Containers 12 are typically filled with the liquid filling product at a temperature above 75° C. The method described here is suitable for bottling the beverage at filling temperatures between approximately 85° C. and 92° C. in particular. The filling pressure of compressed gas 18 introduced after filling containers 12 with liquid 16 may be approximately 2 bar or more, so that the internal pressure of cooled containers 12 is slightly above the ambient atmospheric pressure.

Reference numeral 8 in FIG. 1 denotes a container processing device, which includes the processing modules required for implementing method steps S1 through S4 described above in a structurally integrated manner, which is characterized by the frame surrounding the processing modules. Container processing device 8 thus includes at least one container molding station for molding preforms 10 to form beverage containers 12 by a blow molding method (method step S1), a container filling station having filling device 14 for filling containers 12 with hot liquid 16 (method step S2), a gassing station for pressurizing filled containers 12 with a compressed gas 18 (nitrogen; method step S3), and a sealing device for pressure-tight and airtight sealing of containers 12 using sealing cover 20 (method step S4). According to the exemplary embodiment of the present invention described here, the container molding station and the containing filling station are integrated by design and/or structurally in the manner described here, so that containers 12 undergo a controlled cooling between the container processing stations. This has the particular advantage that containers 12 shrink in a precisely controllable manner, so that largely constant fill levels may be maintained. In addition, hygienic advantages are achieved through the structural integration of container processing device 8 because the risk of contaminants may be significantly reduced on the very short path between container molding and filling.

Figure 2:
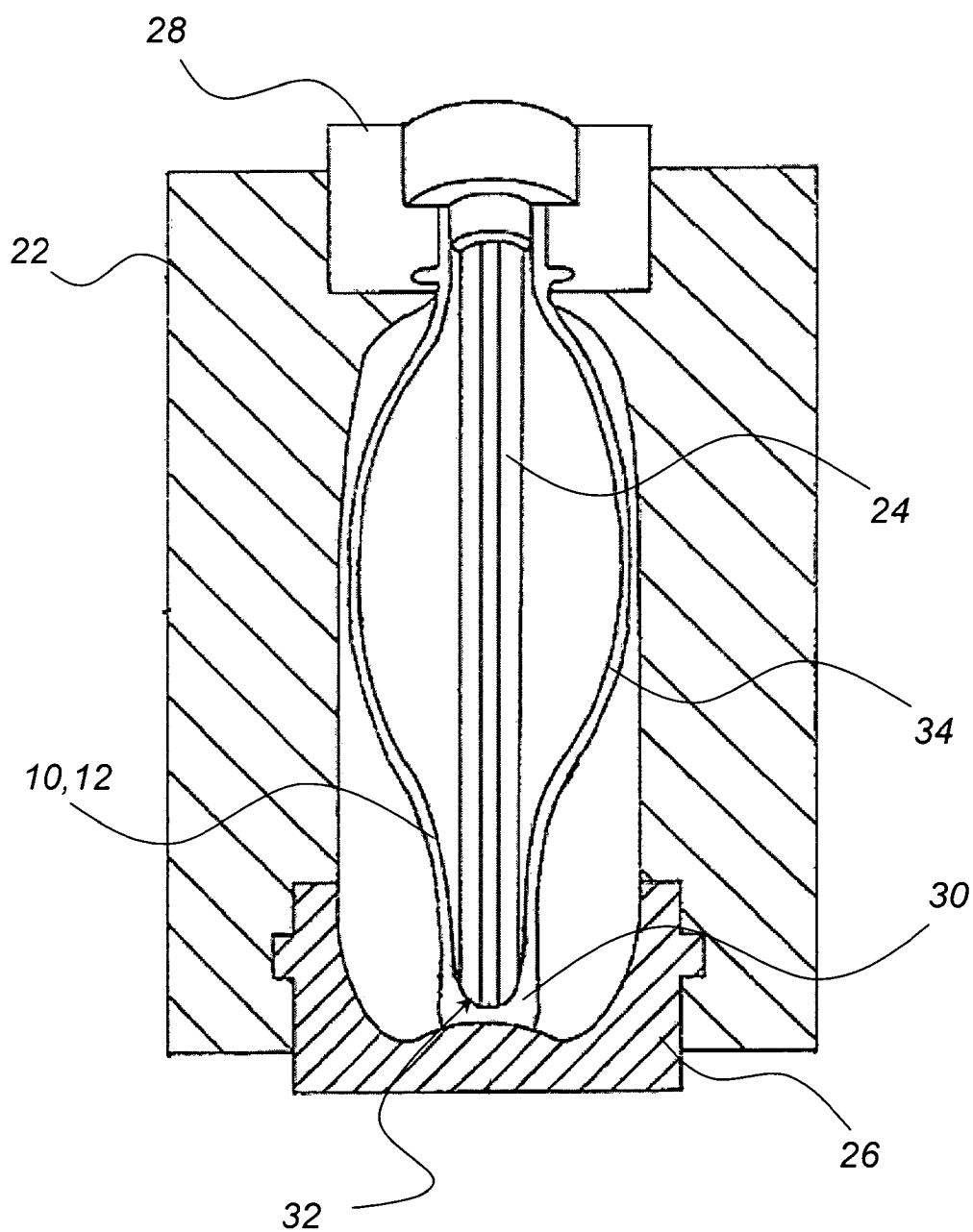
FIG. 2 shows a schematic sectional diagram of a PET container blow molded using a drawing rod.

The schematic longitudinal sectional view in FIG. 2 illustrates one embodiment variant of container molding using a blow mold 22 and a drawing rod 24 movable along the direction of longitudinal extent of preform 10 or container 12. Multipart blow mold 22 has an essentially known design having at least two shell-type halves and a bottom part 26 clampable thereto and a head part 28, which secures preform 10 during the molding operation and also secures finished molded container 12. As already mentioned, with the container processing method according to the present invention, preforms 10 or containers 12 are treated, i.e., drawn during the blow molding operation by liquid or gas and/or with drawing rod 24. Liquid or gas is allowed to escape essentially at one end face 32 oriented to bottom 30 of drawing rod 24 facing container 12 to be molded. Essentially only bottom 30 of container 12 is cooled in this way, while side walls 34 may retain the high temperature prevailing during the blow molding operation.

The present invention is not limited to the exemplary embodiments presented above. Instead, a plurality of variants and modifications is conceivable, making use of the idea according to the present invention and therefore also falling within the scope of the present invention.

LIST OF REFERENCE NUMERALS

8 Container processing device
10 Preform
12 Container
14 Filling device
16 Liquid, beverages
18 Compressed gas
20 Sealing cover
22 Blow mold
24 Drawing rod
26 Bottom part
28 Head part
30 Bottom
32 End face
34 Side wall
S1 First method step
S2 Second method step
S3 Third method step
S4 Fourth method step

I claim:

1. A container processing device comprising:
    a. a blow molding station for molding one or more preforms into containers comprising a plurality of blow molds, wherein each of the plurality of blow molds including a duct system with a liquid temperature-regulating medium in the duct system, wherein the duct system comprises at least two networks of bores in each of the plurality of blow molds, wherein the at least two networks of bores are not fluidly connected to each other;
    b. a container filling station for filling the molded containers with a liquid filling product having a temperature of at least 60° C.;
    c. a gassing station for pressurizing the filled containers with a compressed gas; and
    d. a sealing device for pressure-tight and airtight sealing of the filled containers, wherein the temperature-regulating medium is water.

2. The device of claim 1 wherein each of the plurality of blow molds comprises a bottom portion with one of the at least two networks of bores and an upper portion with another of the at least two networks of bores.

3. The device of claim 2 wherein the container molding station and the container filling station are spatially and/or structurally integrated or combined.

4. The device of claim 3 wherein the blow molding station and the container filling station are integrated in a rotary machine for continuous container molding and container filling.

5. The device of claim 1 wherein the temperature of the upper portion is less than 100° C. and the temperature of the bottom portion is less than 30° C.

6. The device of claim 3 wherein the blow molding station further comprises a cooled drawing rod with an outlet on an end face of the drawing rod facing a bottom of the preform or container.

7. The device of claim 6 wherein the cooled drawing rod is a liquid cooled and/or liquid rinsed drawing rod or is a gas cooled and/or gas purged drawing rod.

8. The device of claim 3 wherein the gassing station utilizes nitrogen as the compressed gas.

9. The device of claim 3 wherein the gassing station pressurizes the filled containers to a pressure of more than 2 bars.

10. The device of claim 3 wherein the container filling station dispenses a liquid filling product having a temperature of at least 75° C.

11. The device of claim 3 wherein the blow molding station utilizes PET to form preforms into containers.

12. The device of claim 3 wherein the container filling station dispenses a liquid filling product having a temperature above a glass transition point of a material utilized by the bold molding station to form preforms into containers.

13. The device of claim 12 wherein the glass transition point of the material is approximately 75° C.

14. The device of claim 13 wherein the container filling dispenses a liquid filling product having a temperature between 85° C. and 92° C.

15. The device of claim 2 wherein the upper portion of each of the plurality of blow molds has at least two halves.

16. The device of claim 1 wherein the temperature-regulating medium in the duct system is between 80° C. and 90° C.

* * * * *